(12) United States Patent
Yang et al.

(10) Patent No.: US 10,236,772 B1
(45) Date of Patent: Mar. 19, 2019

(54) SIGNAL COMMUNICATION FOR CIRCUIT WITH FLOATING GROUND

(71) Applicant: SEMICONDUCTOR COMPONENTS INDUSTRIES, LLC, Phoenix, AZ (US)

(72) Inventors: Seunguk Yang, Anyany (KR); Wonseok Lim, Incheon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/892,609

(22) Filed: Feb. 9, 2018

(51) Int. Cl.
*H02M 3/155* (2006.01)
*H02M 1/08* (2006.01)
*H05B 33/08* (2006.01)
*H02M 7/06* (2006.01)

(52) U.S. Cl.
CPC ............ *H02M 3/155* (2013.01); *H02M 1/08* (2013.01); *H05B 33/0815* (2013.01); *H05B 33/0845* (2013.01); *H02M 7/06* (2013.01)

(58) Field of Classification Search
None
See application file for complete search history.

(56) References Cited

U.S. PATENT DOCUMENTS

| | | | | |
|---|---|---|---|---|
| 6,580,256 B1* | 6/2003 | Martindale | ............ | H02M 3/156 323/280 |
| 2005/0010826 A1* | 1/2005 | Pullen | ................. | H02M 3/156 713/300 |
| 2008/0150505 A1* | 6/2008 | Abe | ......................... | H02M 1/08 323/282 |
| 2012/0249094 A1* | 10/2012 | Zhao | ....................... | H02M 3/00 323/234 |
| 2014/0125386 A1* | 5/2014 | Tajima | ..................... | H02M 1/08 327/109 |
| 2015/0070111 A1* | 3/2015 | Morgan | .................... | H04B 3/54 333/24 C |
| 2017/0168094 A1* | 6/2017 | Chikamatsu | ........ | G01R 15/146 |
| 2018/0026438 A1* | 1/2018 | Peng | ........................ | G06F 1/263 361/86 |

OTHER PUBLICATIONS

Fairchild Semiconductor Coporation, is now part of ON Semiconductor, "FSL306LR Green Mode Buck Switch," Rev2, Feb. 2017.

* cited by examiner

*Primary Examiner* — Jeffrey A Gblende

(74) *Attorney, Agent, or Firm* — AMPACC Law Group, PLLC

(57) ABSTRACT

An electronic device includes a first circuit having a first ground that receives first and second control signals. A third control signal is produced by a second circuit. The second circuit uses a second ground, and the first ground floats with respect to the second ground. The first circuit determines a value corresponding to a value of a third control signal using a difference between a value of the first control signal and a value of the second control signal, the value of a third control signal being a value relative to the second ground. The first circuit controls a value of an output signal of the first circuit according to the value corresponding to the value of a third control signal.

18 Claims, 7 Drawing Sheets

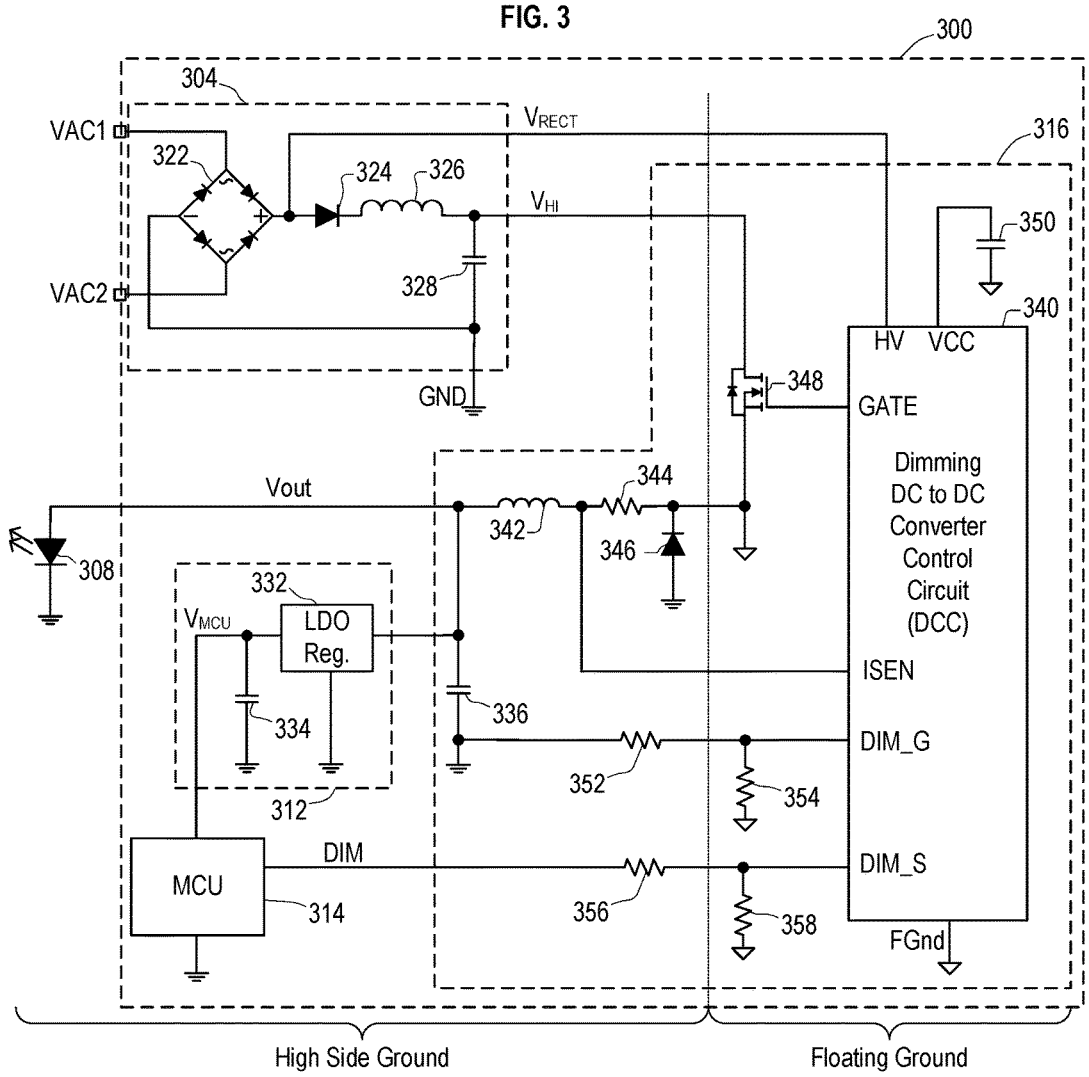
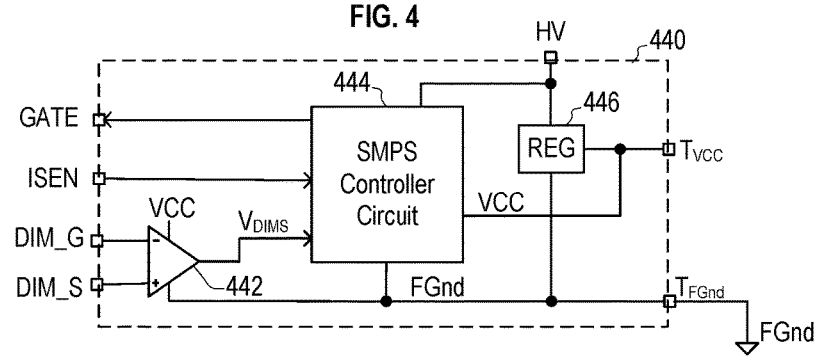

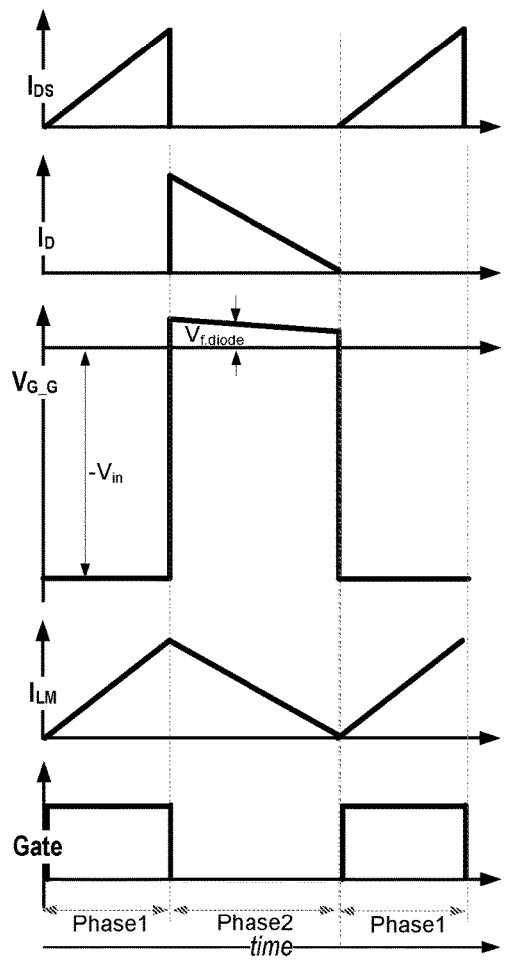
FIG. 5A
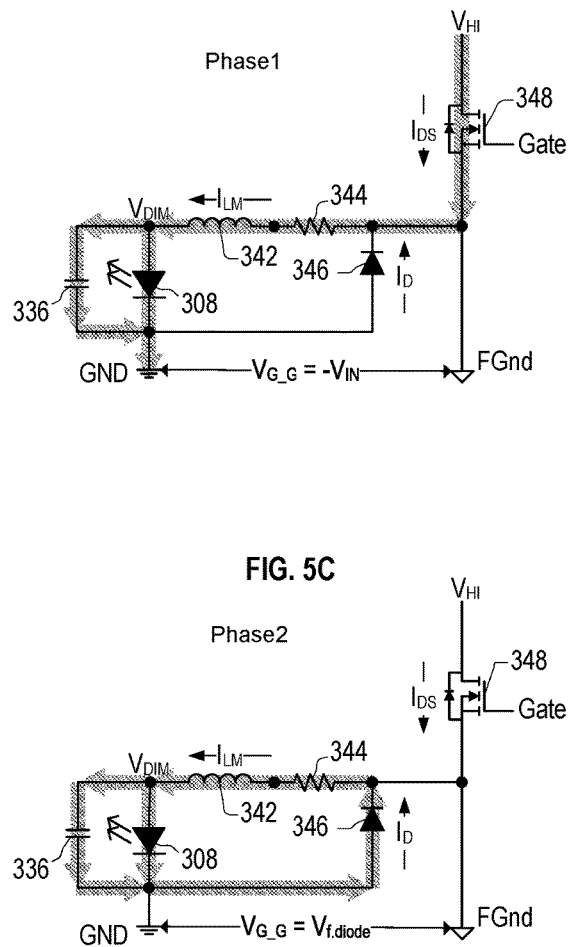

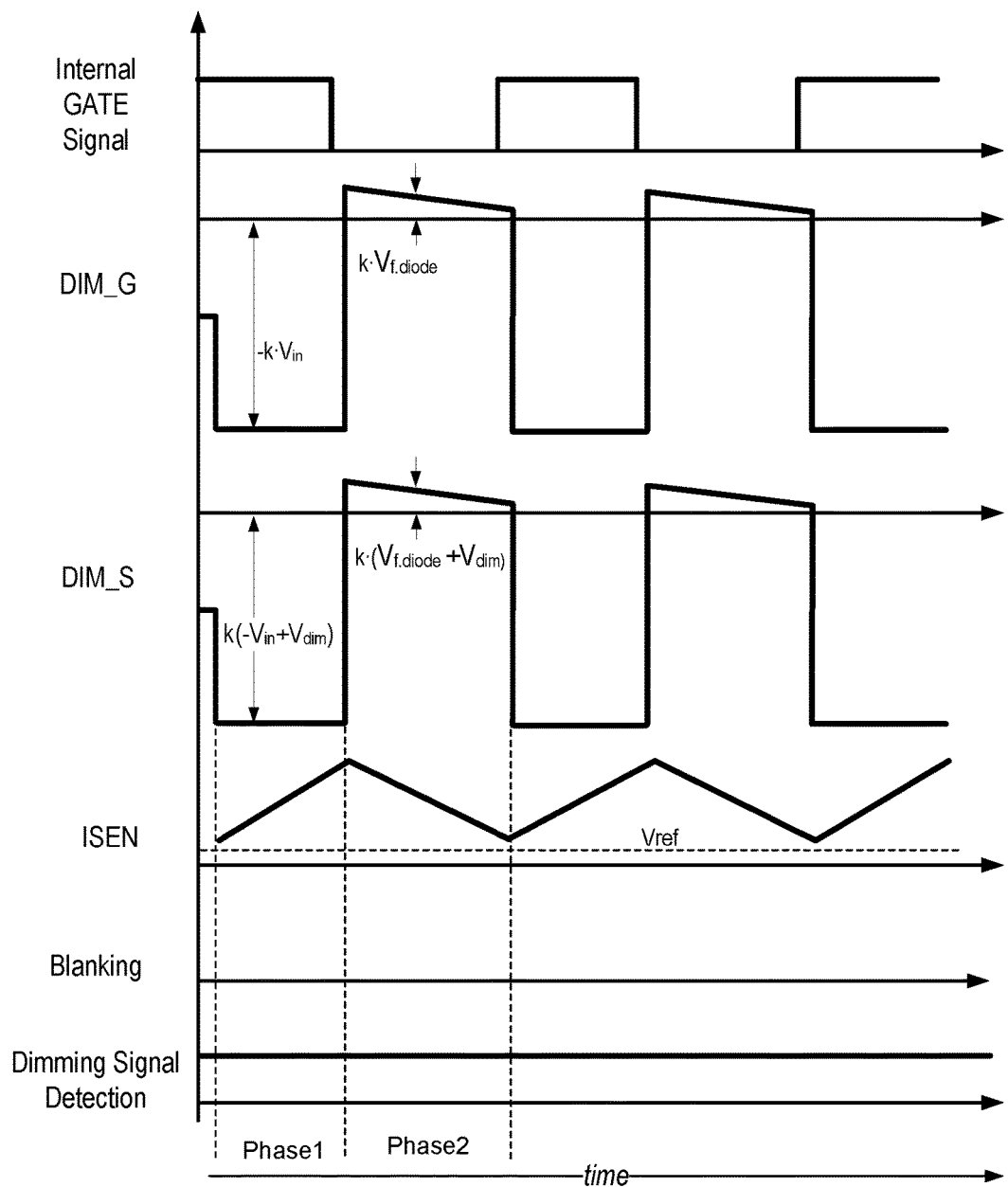

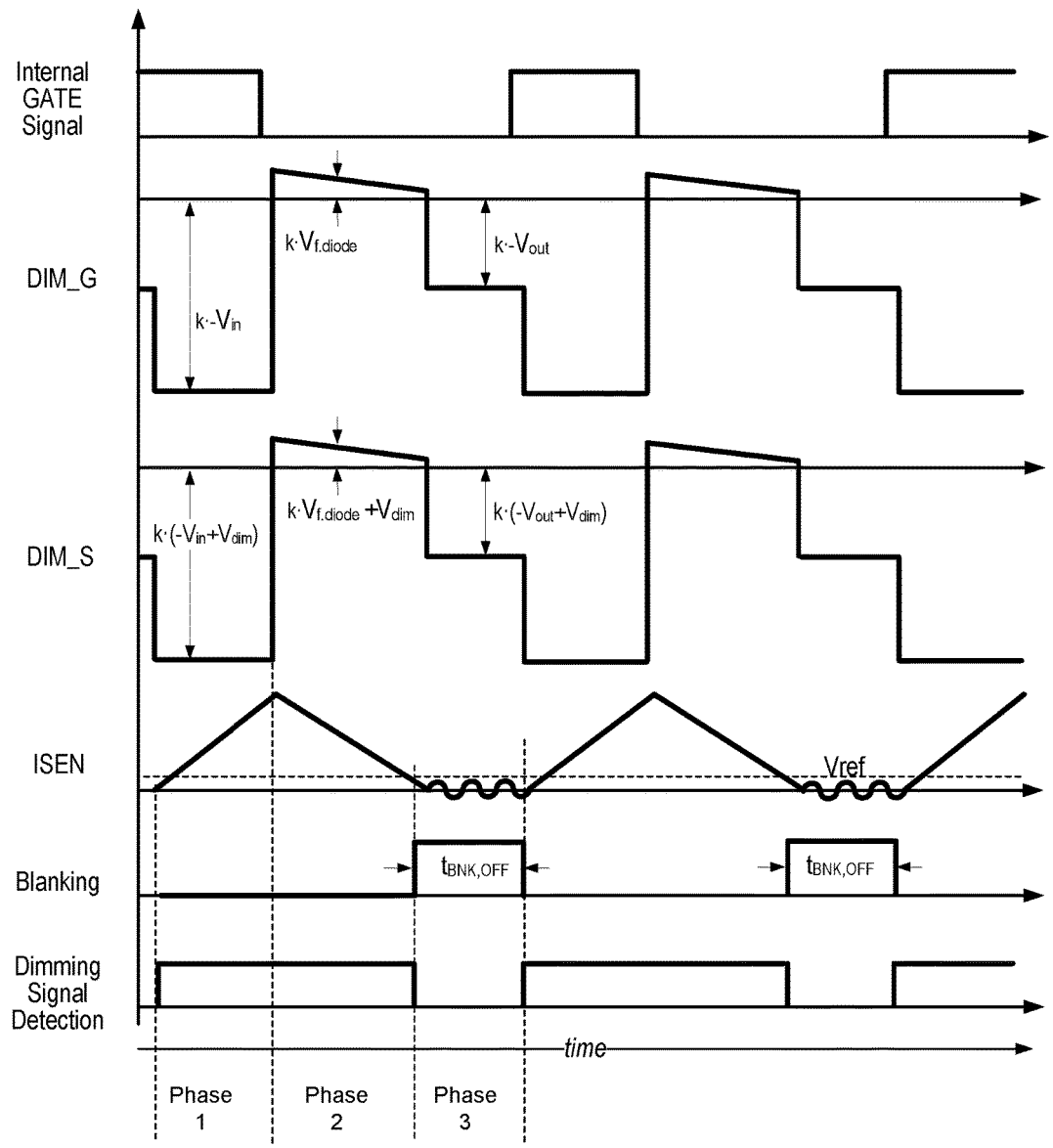

SIGNAL COMMUNICATION FOR CIRCUIT WITH FLOATING GROUND

FIELD OF THE DISCLOSURE

The present disclosure relates to communication of control signals to Direct Current (DC) to DC converters with floating grounds.

BACKGROUND

A circuit may have multiple independent grounds, that is, ground potentials that may vary with respect to each other. The grounds serve as return paths for currents (including power currents and signaling currents) flowing in a respective portions of the circuit, and may also serve as reference voltages in the respective portions of the circuit.

In such a circuit, a first ground may float with respect to a second ground, that is, a voltage difference between the first ground and the second ground may vary over time. The circuit may need to communicate information from a portion of the circuit using the first ground to a portion of the circuit using the second ground. That is, a first circuit using a first ground may need to determine a value, relative to a second ground, of a control signal generated by a second circuit using the second ground, when the first ground floats with respect to the second ground.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

FIG. 3 illustrates a circuit providing an output voltage according to another embodiment.

FIG. 4 illustrates a dimming DC-to-DC converter control circuit according to an embodiment.

FIG. 5A illustrates waveforms of a circuit operating in a Continuous Conduction Mode (CCM) according to an embodiment.

FIG. 5B illustrates current flows in a circuit according to an embodiment during the time of the first mode shown in FIG. 5A.

FIG. 5C illustrates current flows in a circuit according to an embodiment during the time of the second mode shown in FIG. 5A.

FIG. 6 illustrates waveforms of a circuit operating in CCM according to an embodiment.

FIG. 8 illustrates waveforms of a circuit operating in a Discontinuous Conduction Mode (DCM) according to an embodiment.

DETAILED DESCRIPTION

Figure 1:
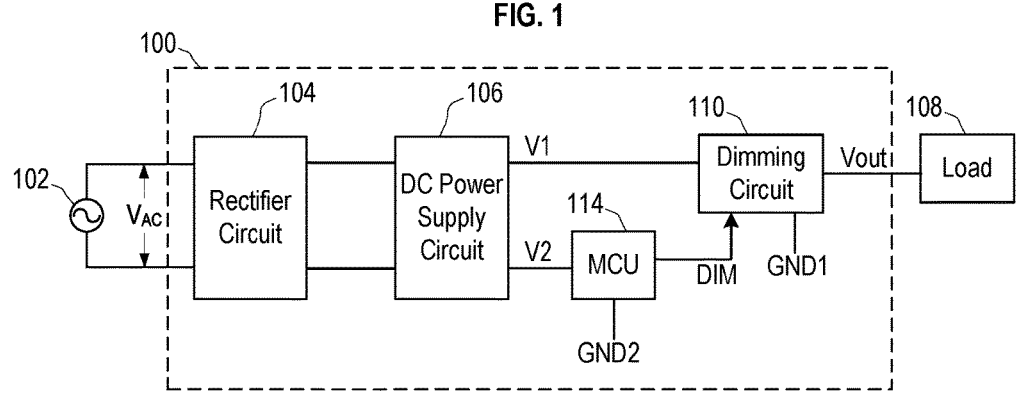
FIG. 1 illustrates a circuit providing an output voltage according to an embodiment.

Embodiments relate to communicating a signal between a first circuit having a first ground and a second circuit having a second ground, wherein the second ground floats with respect to the first ground. In embodiments, the signal is an analog signal. In an embodiment, the signal is communicated without the use of galvanic isolation (such as might be provided in circuits of the related art by an opto-isolator, a transformer, or a capacitor.) In an embodiment, the first and second circuits are both portions of a third circuit.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

In an embodiment, an electronic device includes a first circuit having a first ground. The first circuit receives a first control signal, receives a second control signal, determines a value corresponding to a value of a third control signal using a difference between a value of the first control signal and a value of the second control signal, and controls a value of an output signal of the first circuit according to the value corresponding to the value of a third control signal. The third control signal is produced by a second circuit having a second ground. The value of the third control signal is a value relative to the second ground. The first ground floats relative to the second ground.

Embodiments reduce a cost of an electronic device including first circuit that uses a first ground and a second circuit that uses a second ground, the first ground floating with respect to the second ground, when a signal is communicated to the first circuit from the second circuit without the use of galvanic isolation. The signal may be an analog signal. The signal may correspond to a dimming control signal generated by an MCU included in the second circuit.

The first circuit may use the signal to control an output of a switched mode power supply. The switched mode power supply may produce the output using a rectified voltage derived from an AC supply and having a peak magnitude of 100 to 400 volts.

FIG. 1 illustrates a circuit 100 according to an embodiment. The circuit 100 includes a rectifier circuit 104, a DC Power Supply circuit (DCPS) 106, a dimming circuit 110 (that is, a circuit producing a current or voltage having a value that varies according to a control signal), and a Micro-Controller Unit circuit (MCU) 114. The MCU 114 may include one or more of a processor, a microcontroller, a computer, and the like and may execute programming instructions stored in a non-transitory computer-readable storage medium.

The circuit 100 receives an Alternating Current (AC) voltage $V_{AC}$ from an AC power supply (ACPS) 102. The rectifier circuit 104 produces a DC output from the AC voltage $V_{AC}$. The DC output may be a pulsating DC output, such as a rectified sine wave. In an embodiment, a Root-Mean-Square (RMS) voltage of the ACPS 102 may be between 80 and 280 volts.

The DCPS 106 receives the output of the rectifier circuit 104. The DCPS 106 uses the output of the rectifier circuit 104 to generate a first DC supply voltage V1 for the dimming circuit 110 and a second DC supply voltage V2 for the MCU 114.

The circuit 100 provides an output voltage Vout to a load 108, a value of the output voltage Vout being controlled by the dimming circuit 110 according to a dimming signal DIM generated by the MCU 114. The MCU 114 may generate the dimming signal DIM by executing computer programming instructions stored in a non-transitory computer-readable storage medium.

In an embodiment, the dimming circuit 110 uses a first ground GND1 and the MCU 114 uses a second ground GND2, and the first ground GND1 floats with respect to the second ground GND2. Accordingly, the dimming signal DIM is communicated between the MCU 114 having the second ground GND2 and the dimming circuit 110 having the first ground GND1 that floats with respect to the second ground GND2.

In an embodiment, the dimming signal DIM is an analog signal and is communicated from the MCU 114 to the dimming circuit 110 without the use of galvanic isolation (such as might be provided in circuits of the related art by an opto-isolator, a transformer, or a capacitor).

Figure 2:
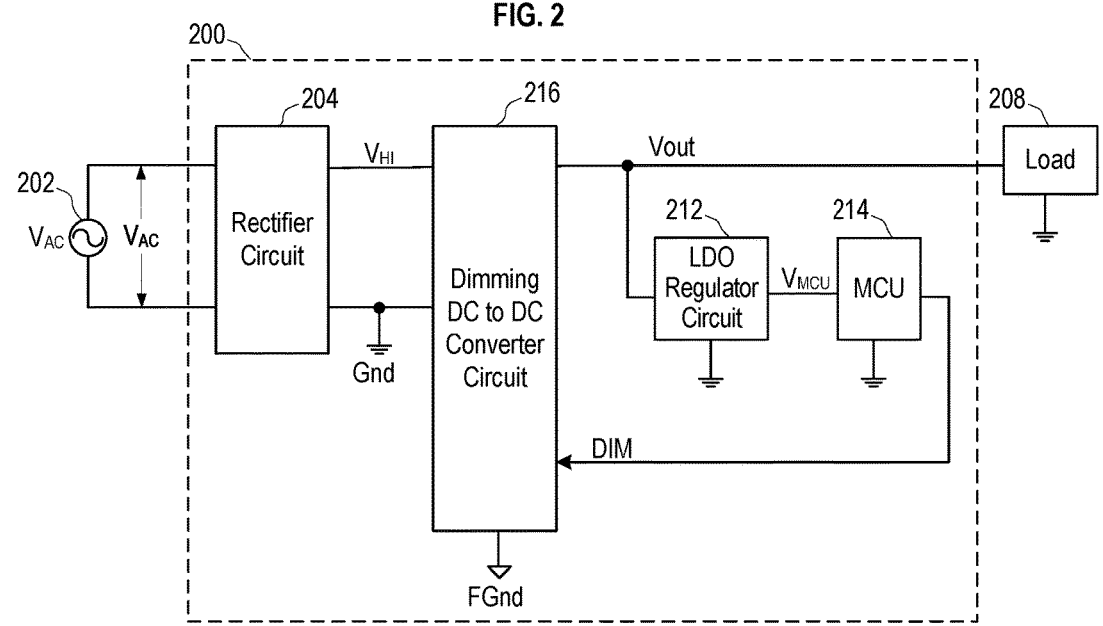
FIG. 2 illustrates a circuit providing an output voltage according to another embodiment.

FIG. 2 illustrates a circuit 200 according to an embodiment. The circuit 200 includes a rectifier circuit 204, a dimming DCPS 216, a Low Drop-Out voltage regulator (LDO) circuit 212 and an MCU 214. The circuit 200 provides the functionality of the circuit 100 of FIG. 1, with the dimming DCPS 216 and the LDO circuit 212 together providing the functionality of the DCPS 106 and the Dimming Circuit 110.

The circuit 200 receives an Alternating Current (AC) voltage $V_{AC}$ from an AC power supply (ACPS) 102. The rectifier circuit 204 produces a DC voltage $V_{HI}$ from the AC voltage $V_{AC}$, with a high-side ground GND being the return path for the DC voltage $V_{HI}$ and some signals generated therefrom. In an embodiment, the DC voltage $V_{HI}$ is a pulsating DC voltage having a peak magnitude of 100 to 400 volts.

The dimming DCPS 216 produces an output voltage Vout having a value that varies according to a dimming signal DIM that the dimming DCPS 216 receives from the MCU 214. The dimming DCPS 216 operates using a floating ground FGnd that floats with respect to the high-side ground GND. The floating ground FGnd may be a low-side ground.

In an embodiment, the dimming signal DIM is an analog signal and is communicated from the MCU 214 to the dimming DCPS 216 without the use of galvanic isolation (such as might be provided in circuits of the related art by an opto-isolator, a transformer, or a capacitor).

Because the dimming signal DIM has a value generated relative to the high-side ground GND and the dimming DCPS 216 operates using the floating ground FGND, the dimming DCPS 216 includes circuits capable of determining the value of the dimming signal DIM relative to the high-side ground GND. In an embodiment, the dimming DCPS 216 does not have a direct connection to the high-side ground GND.

FIG. 3 illustrates a circuit 300 according to an embodiment. The circuit 300 includes a rectifier circuit 304, a dimming DCPS 316, an LDO circuit 312, and an MCU 214. The circuit 200 provides the functionality of the circuit 100 of FIG. 1, with the dimming DCPS 216 and the LDO 212 together providing the functionality of the DCPS 106 and the Dimming Circuit 110.

The rectifier circuit 304 includes a bridge rectifier 322 having first and second inputs respectively connected to first and second AC input phases VAC1 and VAC2. A negative output terminal of the bridge rectifier 322 is connected to a high-side ground GND. A positive output terminal of the bridge rectifier 322 produces a rectified voltage $V_{RECT}$.

The rectifier circuit 304 further includes a first diode 324, a first inductor 326, and a first capacitor 328. The first diode 324 has an anode connected to the rectified voltage $V_{RECT}$. The first inductor 326 has a first terminal connected to a cathode of the first diode 324 and a second terminal connected to a first terminal of the first capacitor 328. A second terminal of the first capacitor 328 is connected to the high-side ground GND. The first diode 324 operates to prevent a current from the first inductor 326 from interfering with a Zero Current Detection (ZCD) function that the dimming DCPS 316 performs using the rectified voltage $V_{RECT}$.

The first inductor 326 and the first capacitor 328 operate as a high frequency filter to prevent ElectroMagnetic Interference (EMI) from propagating from the circuit 300 into the AC power supply providing the AC input phases VAC1 and VAC2.

The rectifier circuit 304 produces a high voltage $V_{HI}$ at the second terminal of the first inductor 326. The high voltage $V_{HI}$ may be a rectified sine wave have a peak voltage corresponding to the peak voltage of the AC input phases VAC1 and VAC2.

The dimming DCPS 316 includes a Dimming DC-to-DC converter Control Circuit (hereinafter, DCC) 340, a second inductor 342, a current sense (CS) resistor 344, a second diode 346, a switch device 348, a second capacitor 350, and a fourth capacitor 336. The DCPS 316 further include first, second, third, and fourth resistors 352, 354, 356, and 358. In an embodiment, the switch device 348 is an n-channel power Metal Oxide Semiconductor Field Effect Transistor (nMOSFET) but embodiment are not limited thereto, and any suitable switch device may be used as the switch device 348.

The DCC 340 receives the rectified voltage $V_{RECT}$ at a high voltage input HV, and generates an internal supply voltage VCC using the rectified voltage $V_{RECT}$. A VCC pin is coupled to a first terminal of the second capacitor 350, which provides energy storage for the internal supply voltage VCC. A second terminal of the second capacitor 350 is connected to a floating ground FGnd, which serves as a ground for the internal circuitry of the DCC 340 and for some other circuits of the dimming DCPS 316.

The DCC 340 receives first and second dimming signals DIM_G and DIM_S and receives a current sense signal ISEN. The DCC 340 controls a gate signal GATE according to the first and second dimming signals DIM_G and DIM_S and the current sense signal ISEN to generate an output voltage Vout having a voltage value, measured relative to the high-side ground GND, according to the first and second dimming signals DIM_G and DIM_S. In an embodiment, the DCC 340 does not have a direct connection to the high-side ground GND.

In the embodiment of FIG. 3, the DCPS 316 is a buck converter, and the DCC 340 controls the gate signal GATE to alternately turn on and off the switch device 348. When the switch device 348 is turned on, the DCPS 316 provides current from the high voltage $V_{HI}$ to the second inductor 342, the LDO circuit 312, and the load 308. When the switch device 348 is turned off, the DCPS 316 provides current, using the energy stored in the second inductor 342, to the load 308 and the LDO circuit 312 through a path including the second diode 346, discharging the second inductor 342.

A voltage difference across the CS resistor 344 is proportional to the current flowing through the second inductor 342 and provides the current sense signal ISEN to the DCC 340.

In the embodiment depicted in FIG. 3, the load 308 includes one or more Light Emitting Diodes (LEDs). The fourth capacitor 336 operates to reduce a ripple current through the load 308.

When the DCC 340 turns the switch device 348 back on before the second inductor 342 has finished discharging, the DCPS 316 operates in Continuous Conduction Mode (CCM). When the DCC 340 turns the switch device 348 back on after the second inductor 342 has finished discharging, the DCPS 316 operates in Discontinuous Conduction Mode (DCM).

In an embodiment, the DCC 340 is incorporated into an integrated circuit package. In an embodiment, the integrated circuit package including the DCC 340 does not have a connection to the high-side ground GND. Because the DCC 340 has only a single ground (the floating ground FGnd) the integrated circuit package may be produced at a reduced price compared to if the DCC 340 had connections to both the high-side ground GND and the floating ground FGnd.

For example, a package having connections to both grounds might need to have a divided lead frame because of the potentially large voltage difference between the two grounds, which divided lead frame would increase the cost of the package. Also, a package having connections to both grounds might need the respective circuits using each ground to be incorporated into separate silicon dice, which would also increase costs.

The LDO circuit 312 includes an LDO regulator device 332 and a third capacitor 334. The LDO circuit 312 receives the output voltage Vout and produces an MCU supply voltage $V_{MCU}$. In embodiments, a voltage of the MCU supply voltage $V_{MCU}$ is 3.3 or 5 volts, measured relative to the high-side ground GND. In an embodiment, a minimum value of the output voltage Vout is greater than the MCU supply voltage $V_{MCU}$ by at least a drop-out voltage of the LDO regulator device 332.

The MCU 314 generates the dimming signal DIM having a variable voltage. The voltage of the dimming control signal DIM may correspond to a control input from a user or sensor or to a programmatically generated value that may vary over time. The value of the dimming control signal DIM is relative to the high-side ground GND. In an embodiment, the dimming signal DIM is an analog signal.

The first and second resistors 352 and 354 are configured as a first voltage divider that provides the first dimming signal DIM_G as an output according to a value of the high-side ground GND relative to the floating ground FGnd. The value $V_{DIM\_G}$ of the first dimming signal DIM_G relative to the floating ground FGnd, is equal to:

$$V_{DIM\_G} = \frac{R_{354}}{R_{352} + R_{354}}(V_{GND} - V_{FGnd}) \qquad \text{Eq. 1}$$

wherein $R_{352}$ is a resistance value of the first resistor 352, $R_{354}$ is a resistance value of the second resistor 354, $V_{GND}$ is a voltage value of the high-side ground GND, and $V_{FGnd}$ is a voltage value of the floating ground FGnd, and $V_{GND}$ and $V_{FGnd}$ are measured relative to a same potential.

The second and third resistors 356 and 358 are configured as a second voltage divider that provides the second dimming signal DIM_S as an output according to a value of dimming control signal DIM relative to the floating ground FGnd. The value $V_{DIM\_S}$ of the second dimming signal DIM_S, relative to the floating ground FGnd, is equal to:

$$V_{DIM\_S} = \frac{R_{358}}{R_{356} + R_{358}}(V_{DIM} - V_{FGnd}) \qquad \text{Eq. 2}$$

wherein $R_{356}$ is a resistance value of the third resistor 356, $R_{358}$ is a resistance value of the fourth resistor 358, $V_{DIM}$ is a voltage value of the dimming control signal DIM, and $V_{DIM}$ and $V_{FGnd}$ are measured relative to a same potential.

In an embodiment wherein a ratio of the resistances of the first and second resistors 352 and 354 is the same as a ratio of the resistances of the third and fourth resistors 356 and 358, $$\frac{R_{354}}{R_{352} + R_{354}}$$

is equal to $$\frac{R_{358}}{R_{356} + R_{358}}.$$

Where $$k = \frac{R_{358}}{R_{356} + R_{358}},$$

then for the first and second dimming signals DIM_G and DIM_S:

$$V_{DIM_G} = k(V_{GND} - V_{FGnd}) \qquad \text{Eq. 3}$$

$$V_{DIM_S} = k(V_{DIM} - V_{FGnd}) \qquad \text{Eq. 4}$$

$$V_{DIM_S} - V_{DIM_G} = k(V_{DIM} - V_{GND}) \qquad \text{Eq. 5}$$

so that the difference between the second and first dimming signals DIM_S and DIM_G is proportional to the voltage value, relative to the high voltage ground GND, of the dimming control signal DIM.

FIG. 4 illustrates a DC-to-DC converter control circuit (hereinafter, DCC) 440 according to an embodiment. The DCC 440 is suitable for use as the DCC 340 of the dimming DCPS 316 of FIG. 3. The DCC 440 includes a differential amplifier 442, a Switch Mode Power Supply (SMPS) controller circuit (hereinafter SMPS controller) 444, and a voltage regulator circuit 446.

The DCC 440 receives a high voltage signal HV, a current sense signal ISEN, and first and second dimming signals DIM_G and DIM_S. The DCC 440 produces a gate signal GATE according to the received signals.

The DCC 440 further includes a floating ground terminal $T_{FGnd}$ and internal supply voltage terminal $T_{VCC}$. The floating ground terminal $T_{FGnd}$ provides the floating ground FGnd use by the DCC 440 for use by external circuits. The voltage regulator circuit 446 generates, using the high voltage signal HV, an internal supply voltage VCC having a predetermined voltage value relative to the floating ground FGnd. The internal supply voltage terminal $T_{VCC}$ may be used to connect an energy storage component, such as the second capacitor 350 of FIG. 3, to the internal supply voltage VCC.

The differential amplifier 442 receives the first and second dimming signals DIM_G and DIM_S and produces a dimming voltage $V_{DIMS}$ according to those signals. In an embodiment, a value of the dimming voltage $V_{DIMS}$ corresponds to a difference between the second dimming signal DIM_S and the first dimming signal DIM_G.

The SMPS controller 444 receives the dimming voltage $V_{DIMS}$, the current sense signal ISEN, and the high voltage signal HV and generates the gate signal GATE therefrom. In an embodiment, the SMPS controller 444 turns the gate signal GATE on and off to control an average current provided to a load according to values of the current sense signal ISEN, and may be capable of operating in one or more of a Continuous Conduction Mode (CCM), a Discontinuous Conduction Mode (DCM), and the like. The SMPS controller 444 may generate a blanking signal having a duration equal to a blanking interval to prevent premature assertion of the gate signal GATE by ringing on the current sense signal ISEN that may occur when the value of the current sense signal ISEN drops to zero.

The SMPS controller 444 uses values of the dimming voltage $V_{DIMS}$ to determine the average current to be provided to the load, which corresponds to a value of the dimming signal DIM relative to the high-side ground GND in FIG. 3.

In an embodiment, the SMPS controller 444 detects zero crossings of the high voltage signal HV in order to provide Power Factor Correction (PFC).

In an embodiment, the SMPS controller 444 detects zero crossings of the high voltage signal HV in order to turn the gate signal GATE on when a voltage drop across a switch device controlled by the gate signal GATE is lower than a predetermined threshold value (e.g., substantially zero volts).

FIG. 5A illustrates waveforms of the circuits shown in FIG. 3 when operating in a Continuous Conduction Mode (CCM) according to an embodiment. The waveforms include a drain-source current $I_{DS}$ of the switch device 348, a diode current $I_D$ through the second diode 346, a ground difference voltage $V_{G\_G}$ between the high-side ground GND and the floating ground FGnd, an inductor current $I_{LM}$ through the second inductor 342, and a value of the gate signal GATE having a high value corresponding to the switch device 348 being on and a low value corresponding to the switch device 348 being off.

FIG. 5B illustrates current flows of the circuits shown in FIG. 3 during the time of the first phase PHASE1 shown in FIG. 5A. The current flow is indicated by gray arrows.

In the first phase PHASE1, the switch device 348 is on and current flows from the high voltage $V_{HI}$ into the second inductor 342 and the load 308, then returns to the source of the high voltage $V_{HI}$ via the high-side ground GND. The ground difference voltage $V_{G\_G}$ is equal to the negative of the present voltage value $V_{in}$ of the high voltage $V_{HI}$.

FIG. 5C illustrates current flows of the circuits shown in FIG. 3 during the time of the second phase PHASE2 shown in FIG. 5A. The current flow is indicated by gray arrows.

In the second phase PHASE2, the switch device 348 is off and current generated by the energy stored in the second inductor 342 flows through to the load 308 and returns to second inductor 342 through the second diode 346. The ground difference voltage $V_{G\_G}$ is equal to a forward voltage drop $V_{f.diode}$ of the second diode 346.

FIG. 6 illustrates waveforms of the circuits shown in FIG. 3 when operating in CCM according to an embodiment. The waveforms include values of an internal GATE signal that corresponds, after a propagation delay, to the gate signal GATE of FIG. 3, values of the first dimming signal DIM_G, values of the second dimming signal DIM_S, values of the current sense signal ISEN, values of an internal blanking signal, and values of a dimming signal detection signal.

The internal blanking signal corresponds to a blanking period that prevents premature assertion of the gate signal GATE by ringing on the current sense signal ISEN. The dimming signal detection signal indicates when the first and second dimming signals DIM_G and DIM_S may be used to determine a dimming voltage $V_{DIM}$ having a value, relative to the floating ground FGnd, corresponding to a value of the dimming signal DIM relative to the high-side ground GND in FIG. 3.

Because the circuit operates in CCM, the current through the second inductor 342 of FIG. 3 never drops to zero, and therefore the value of the current sense signal ISEN never drops below the threshold (Vref) used to activate the blanking signal. The dimming signal detection signal is produced according to the blanking signal, and because the blanking signal is not asserted in FIG. 6, the dimming signal detection signal is always asserted in FIG. 6.

During the first phase PHASE1, the switch device 348 has been turned on, after a short delay, by the assertion of the internal GATE signal. During this time, as described with respect to FIGS. 5A and 5B, the difference in voltage values between the high-side ground GND and the floating ground FGnd is Vin, where Vin is the instantaneous voltage value of the high voltage $V_{HI}$. When a ratio of the resistances of the first and second resistors 352 and 354 (i.e., $R_{352}$ and $R_{354}$) is the same as a ratio of the resistances of the third and fourth resistors 356 and 358 (i.e., $R_{356}$ and $R_{358}$), and $$k = \frac{R_{354}}{R_{352} + R_{354}},$$

the first dimming signal DIM_G has a voltage value of k times the negative of •Vin of the high voltage $V_{HI}$ and the second dimming signal DIM_S has a voltage value of k times the sum of the negative of •Vin and the voltage value $V_{dim}$, relative to the high-side ground GND, of the dimming control signal DIM.

During the second phase PHASE2, the switch device 348 has been turned off, after a short delay, by the de-assertion of the internal GATE signal. During this time, as described with respect to FIGS. 5A and 5C, the difference in voltage values between the high-side ground GND and the floating ground FGnd is the forward voltage drop $V_{f.diode}$ through the second diode 346. When a ratio of the resistances of the first and second resistors 352 and 354 (i.e., $R_{352}$ and $R_{354}$) is the same as a ratio of the resistances of the third and fourth resistors 356 and 358 (i.e., $R_{356}$ and $R_{358}$), and $$k = \frac{R_{354}}{R_{352} + R_{354}},$$

the first dimming signal DIM_G has a voltage value of k times the forward voltage drop $V_{f.diode}$ and the second dimming signal DIM_S has a voltage value of k times the sum of forward voltage drop $V_{f.diode}$ and the voltage value $V_{dim}$, relative to the high-side ground GND, of the dimming control signal DIM.

As a result, a value proportional to the voltage value $V_{dim}$ relative to the high-side ground GND of the dimming control signal DIM can be determined at any time during PHASE1 and PHASE2 by subtracting the value of the first dimming signal DIM_G from the value of the second dimming signal DIM_S, such as is done by the differential amplifier 442 of FIG. 4.

Figure 7A:
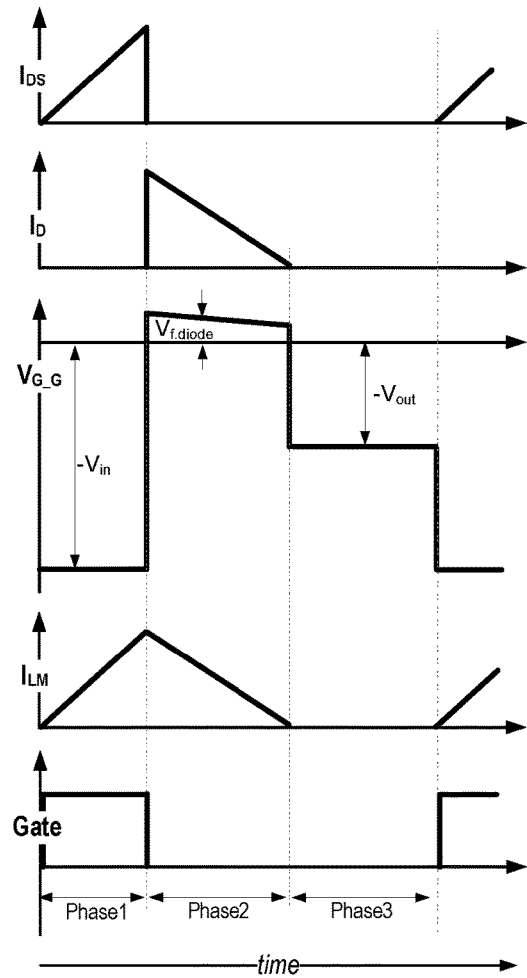
FIG. 7A illustrates waveforms of a circuit operating in a Discontinuous Conduction Mode (DCM) according to an embodiment.

FIG. 7A illustrates waveforms of a circuit operating in a Discontinuous Conduction Mode (DCM) according to an embodiment. The waveforms include a drain-source current $I_{DS}$ of the switch device 348, a diode current $I_D$ through the second diode 346, a ground difference voltage $V_{G\_G}$ between the high-side ground GND and the floating ground FGnd, an inductor current km through the second inductor 342, and a value of the gate signal GATE having a high value corresponding to the switch device 348 being on and a low value corresponding to the switch device 348 being off.

Figure 7B:
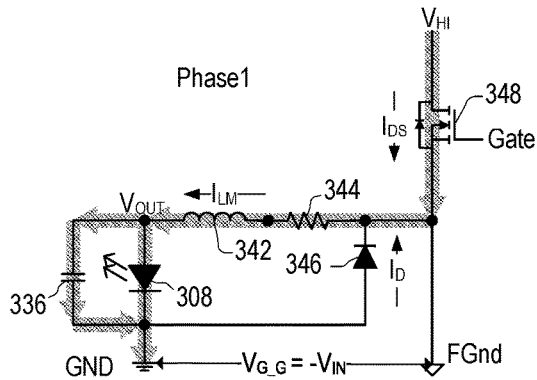
FIG. 7B illustrates current flows in a circuit according to an embodiment during the time of the first mode shown in FIG. 7A.

FIG. 7B illustrates current flows of the circuits shown in FIG. 3 during the time of the first phase PHASE1 shown in FIG. 7A. The current flow is indicated by gray arrows.

In the first phase PHASE1, the switch device 348 is on and current flows from the high voltage $V_{HI}$ into the second inductor 342 and the load 308, then returns to the source of the high voltage $V_{HI}$ via the high-side ground GND. The ground difference voltage $V_{G\_G}$ is equal to the negative of the present voltage value $V_{in}$ of the high voltage $V_{HI}$.

Figure 7C:
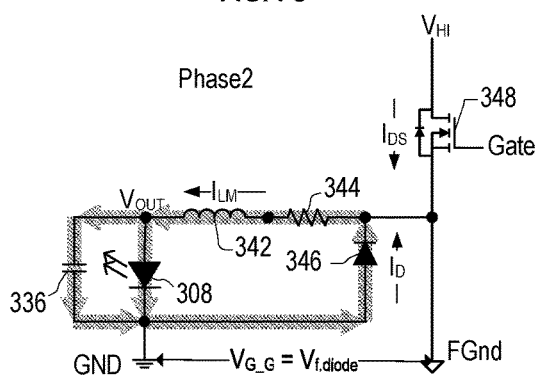
FIG. 7C illustrates current flows in a circuit according to an embodiment during the time of the second mode shown in FIG. 7A.

FIG. 7C illustrates current flows of the circuits shown in FIG. 3 during the time of the second phase PHASE2 shown in FIG. 7A. The current flow is indicated by gray arrows.

In the second phase PHASE2, the switch device 348 is off and current generated by the energy stored in the second inductor 342 flows through to the load 308 and returns to second inductor 342 through the second diode 346. The ground difference voltage $V_{G\_G}$ is equal to a forward voltage drop of the second diode 346.

Figure 7D:
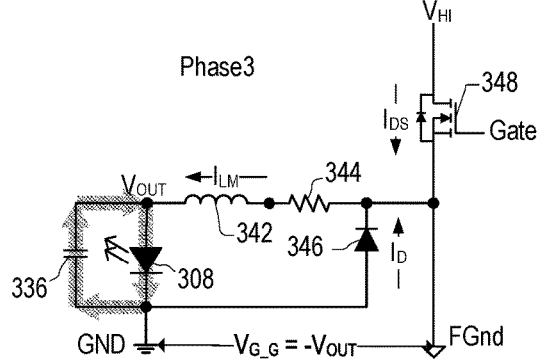
FIG. 7D illustrates current flows in a circuit according to an embodiment during the time of the third mode shown in FIG. 7A.

FIG. 7D illustrates current flows of the circuits shown in FIG. 3 during the time of the third phase PHASE3 shown in FIG. 7A. The current flow is indicated by gray arrows.

In the third phase PHASE3, the switch device 348 is off and the energy stored in the second inductor 342 has been depleted. Accordingly, the current that flows through to the load 308, if any, originates and returns to the fourth capacitor 336. Since no current flows through the second inductor 342, the ground difference voltage $V_{G\_G}$ must be equal to the negative of the output voltage VOUT provided to the load 308.

FIG. 8 illustrates waveforms of the circuits shown in FIG. 3 when operating in DCM according to an embodiment. The waveforms include values of an internal GATE signal that corresponds, after a propagation delay, to the gate signal GATE of FIG. 3, values of the first dimming signal DIM_G, values of the second dimming signal DIM_S, values of the current sense signal ISEN, values of an internal blanking signal, and values of a dimming signal detection signal.

In an embodiment, the internal blanking signal may correspond to a blanking period that prevents premature assertion of the gate signal GATE by ringing on the current sense signal ISEN. The dimming signal detection signal indicates when the first and second dimming signals DIM_G and DIM_S may be used to determine a dimming voltage VIM/I having a value, relative to the floating ground FGnd, corresponding to a value of the dimming signal DIM relative to the high-side ground GND in FIG. 3.

Because the circuit operates in DCM, the current through the second inductor 342 of FIG. 3 will on occasion drop to or near zero, which is detected by detecting when the current sense signal ISEN drops below the threshold (Vref). This causes the assertion of the blanking signal for a blanking duration $T_{BNK.OFF}$. The dimming signal detection signal is produced according to the blanking signal, so that when the blanking signal is asserted the dimming signal detection signal is de-asserted, and when the blanking signal is de-asserted the dimming signal detection signal is asserted.

During the first phase PHASE1, the switch device 348 has been turned on, after a short delay, by the assertion of the internal GATE signal. During this time, as described with respect to FIGS. 7A and 7B, the difference in voltage values between the high-side ground GND and the floating ground FGnd is −Vin, where Vin is the instantaneous voltage value of the high voltage $V_{HI}$. When a ratio of the resistances of the first and second resistors 352 and 354 (i.e., $R_{352}$ and $R_{354}$) is the same as a ratio of the resistances of the third and fourth resistors 356 and 358 (i.e., $R_{356}$ and $R_{358}$), and $$k = \frac{R_{354}}{R_{352} + R_{354}},$$

the first dimming signal DIM_G has a voltage value of k times the negative of •Vin of the high voltage $V_{HI}$ and the second dimming signal DIM_S has a voltage value of k times the sum of the negative of •Vin and the voltage value $V_{dim}$, relative to the high-side ground GND, of the dimming control signal DIM.

During the second phase PHASE2, the switch device 348 has been turned off, after a short delay, by the de-assertion of the internal GATE signal. During this time, as described with respect to FIGS. 7A and 7C, the difference in voltage values between the high-side ground GND and the floating ground FGnd is the forward voltage drop $V_{f.diode}$ through the second diode 346. When a ratio of the resistances of the first and second resistors 352 and 354 (i.e., $R_{352}$ and $R_{354}$) is the same as a ratio of the resistances of the third and fourth resistors 356 and 358 (i.e., $R_{356}$ and $R_{358}$), and $$k = \frac{R_{354}}{R_{352} + R_{354}},$$

the first dimming signal DIM_G has a voltage value of k times the forward voltage drop $V_{f.diode}$ and the second dimming signal DIM_S has a voltage value of k times the sum of forward voltage drop $V_{f.diode}$ and the voltage value $V_{dim}$, relative to the high-side ground GND, of the dimming control signal DIM.

During the third phase PHASE3, the switch device 348 is still off. The energy stored in the second inductor 342 has been depleted, and as a result the value of the current sense signal ISEN has dropped below a reference voltage Vref. In response to the current sense signal ISEN dropping below the reference voltage Vref, the blanking signal is asserted for a blanking duration $t_{BNK,OFF}$. While the blanking signal is asserted, the dimming signal detection signal is de-asserted.

In order to prevent the detection of spurious values of the dimming control signal DIM, the difference between the first and second dimming signals DIM_G and DIM_S may not be used to determine a value corresponding to the voltage value $V_{dim}$ of the dimming control signal DIM when the dimming signal detection signal is de-asserted. Instead, a previously determined value corresponding to the voltage value $V_{dim}$ of the dimming control signal DIM may be used as the value corresponding to the voltage value $V_{dim}$ of the dimming control signal DIM. The previously determined value may be a value sampled when the dimming signal detection signal was asserted and held by, for example, a sample-and-hold circuit.

Accordingly, in an embodiment operating in DCM, a value proportional to the voltage value $V_{dim}$ relative to the high-side ground GND of the dimming control signal DIM can be determined by the DCPS 316 at any time during PHASE1 and PHASE2, as indicated by the dimming signal detection signal being asserted. The value proportional to the voltage value $V_{dim}$ may be determined by subtracting the value of the first dimming signal DIM_G from the value of the second dimming signal DIM_S, such as is done by the differential amplifier 442 of FIG. 4.

Because of the ringing that occurs during PHASE3, the value proportional to the voltage value $V_{dim}$ relative to the high-side ground GND may not be determined during PHASE3, as indicated by the dimming signal detection signal being de-asserted. Instead, the DCPS 316 may include a sample-and-hold circuit operated according to a dimming signal detection signal to provide, during PHASE3, such a value proportional to a voltage value $V_{dim}$ relative to the high-side ground GND.

Figure 9:
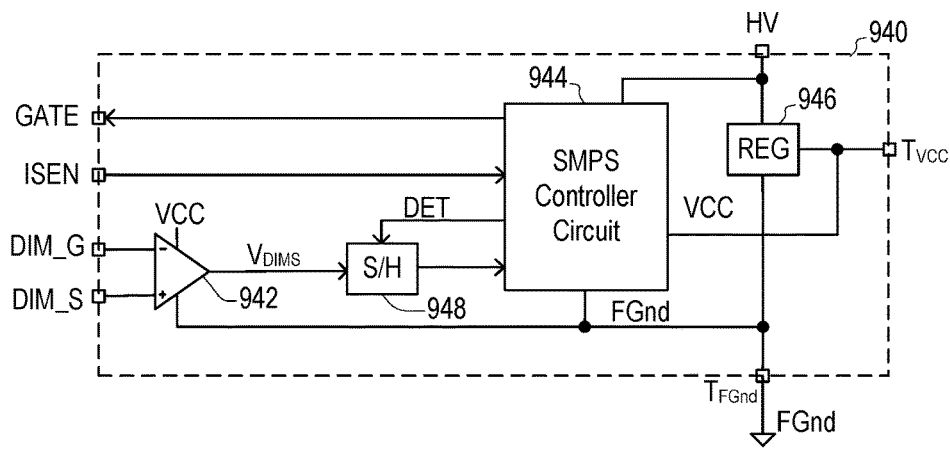
FIG. 9 illustrates a dimming DC-to-DC converter control circuit according to another embodiment.

FIG. 9 illustrates a dimming DC-to-DC converter control circuit (DCC) 940 according to an embodiment. The DCC 940 is suitable for use as the DCC 340 of the dimming DCPS 316 of FIG. 3. The DCC 940 includes a differential amplifier 942, a Switch Mode Power Supply (SMPS) controller circuit (hereinafter SMPS controller) 944, a voltage regulator circuit 946, and a Sample and Hold (S/H) circuit 948. Features of the DCC 940 of FIG. 9 having reference characters of the form 9xx correspond to features of the DCC 440 of FIG. 4 having reference characters of the form 4xx when present, and are similar except as described below.

Accordingly, the SMPS controller 944 has the characteristics and functions described previously for the SMPS controller 444 of FIG. 4. In addition, the SMPS controller 944 produces a dimming signal detection signal DET that is asserted when the current values of the first dimming signal DIM_G from the value of the second dimming signal DIM_S are to be used to determine the value corresponding to the value of the dimming control signal DIM of FIG. 3, and is de-asserted otherwise.

The S/H circuit 948 receives the dimming voltage $V_{DIMS}$ and the dimming signal detection signal DET. When the dimming signal detection signal DET is asserted, the S/H circuit 948 passes the value of the dimming voltage $V_{DIMS}$ through to the SMPS controller 944. In response to the dimming signal detection signal DET being de-asserted, the S/H circuit 948 samples the value of the dimming voltage $V_{DIMS}$. When the dimming signal detection signal DET is de-asserted, the S/H circuit 948 holds the most recently sampled value of the dimming voltage $V_{DIMS}$ and provides the held value to the SMPS controller 944.

The SMPS controller 944 uses the output of the S/H circuit 948 in the same manner as the SMPS controller 444 of FIG. 4 uses the dimming voltage $V_{DIMS}$.

In another embodiment, two S/H circuit controlled by the dimming signal detection signal DET may be used to sample and hold the inputs, instead of the output, of the differential amplifier 942, operating in a manner similar to the S/H circuit 948.

Figure 10:
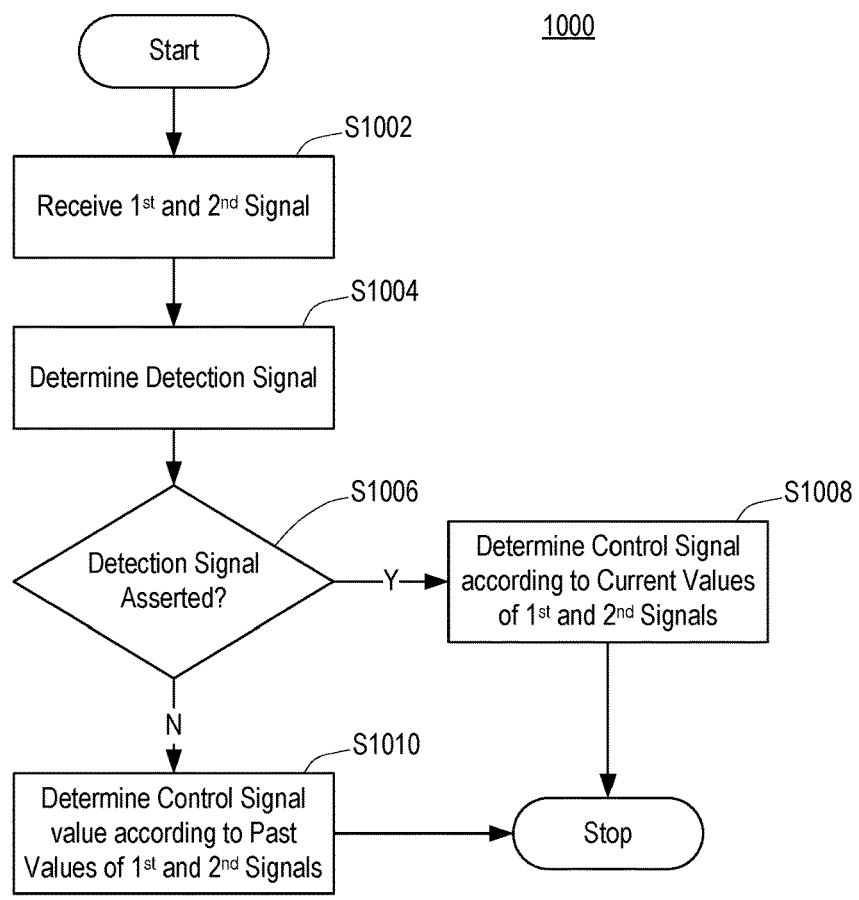
FIG. 10 illustrates a process of communicating a control signal according to an embodiment.

FIG. 10 illustrates a process 1000 of communicating a control signal according to an embodiment. The process 1000 may be performed by a first circuit that uses a first ground to determine a value of a signal generated by a second circuit using a second ground, where the first ground floats with respect to the second ground. For example, the process 100 may be performed by the dimming circuit 110 of FIG. 1 to receive the dimming signal DIM from the MCU 114, or may be performed by the dimming DCPS 216 of FIG. 2 to receive the dimming signal DIM from the MCU 214.

In an embodiment, the control signal generated by the second circuit is an analog signal, In an embodiment, the communication of the control signal is performed without the use of galvanic isolation devices.

At S1002, the process 1000 receives the first and second signals. In an embodiment, the first signal has a value corresponding to a voltage difference between the first ground and the second ground. In an embodiment, the second signal has a value corresponding to a voltage difference between the control signal generated by the second circuit (using the second ground) and the first ground.

In an embodiment, the first signal is produced as an output of a first voltage divider having a first input coupled to the first ground and a second input coupled to the second ground. In an embodiment, the second signal is produced as an output of a second voltage divider having a first input coupled to the first ground and a second input coupled to the control signal.

At S1004, the process 1000 determines a detection signal. In an embodiment, the process 1000 asserts the detection signal during periods of time when a value corresponding to a value of the control signal may be reliably determined from the first and second signals, and de-asserts the detection signal during periods of time when the value corresponding to the value of the control signal may not be reliably determined from the first and second signals. In as embodiment, the process 1000 de-asserts the detection signal during periods of time when ringing in a circuit comprising the first and second circuits may interfere with the determination of the value corresponding to the value of the control signal from the first and second signals.

In an embodiment wherein the first circuit includes a Switch Mode Power Supply (SMPS) controller, when the SMPS controller operates in a Discontinuous Conduction Mode (DCM), the process 1000 de-asserts the detection signal during a blanking interval and asserts the detection signal otherwise, the blanking interval being an interval where a switch device controlled by the SMPS controller to provide current to an inductor is prevented from being turned on. In an embodiment wherein the first circuit includes a Switch Mode Power Supply (SMPS) controller, when the SMPS controller operates in a Continuous Conduction Mode (CCM), the process 1000 always asserts the detection signal.

At S1006, when the detection signal is asserted, the process 1000 proceeds to S1008, and when the detection signal is not asserted, the process 1000 proceeds to S1010.

At S1008, the process 1000 determines a value corresponding to the value of the control signal according to present values of the first and second signals, and then exits.

In an embodiment, the process 1000 determines the value corresponding to the value of the control signal by subtracting a value of the first signal from a value of the second signal. In an embodiment, the value corresponding to the value of the control signal is proportional to the value of the control signal.

At S1010, the process 1000 determines a value corresponding to the value of the control signal according to past values of the first and second signals, and then exits.

In an embodiment, the process 1000 may sample, in response to the detection signal being de-asserted, a value corresponding to the value of the controls signal that was determined using the first and second signals, and at S1010 may use the sampled value as the value corresponding to the value of the control signal when the detection signal is de-asserted.

In another embodiment, the process 1000 may sample, in response to the detection signal being de-asserted, respective values of the first and second signals, and at S1010 may determine the value corresponding to the value of the control signal using the sampled values when the detection signal is de-asserted. The value corresponding to the value of the control signal may be determined in a manner analogous to how the value of the control signal is determined at S1008.

The value of the control signal determined by the process 1000 may be used to control operations of the first circuit. For example, the value of the control signal determined by the process 1000 may be used to determine a magnitude of a current or voltage produced under the control of the first circuit.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. An electronic device comprising:
   a first circuit having a first ground and including a difference circuit and a controller circuit, the first circuit configured to:
   receive a first control signal,
   receive a second control signal,
   determine, using the difference circuit, a value corresponding to a value of a third control signal using a difference between a value of the first control signal and a value of the second control signal; and
   control, using the controller circuit, a value of an output signal of the first circuit according to the value corresponding to the value of a third control signal;
   wherein the third control signal is produced by a second circuit having a second ground,
   wherein the value of the third control signal is a value relative to the second ground,
   wherein the first control signal corresponds to a voltage difference between the second ground and the first ground,
   wherein the second control signal corresponds to a voltage difference between the third control signal and the first ground, and
   wherein the first ground floats relative to the second ground.

2. The electronic device of claim 1, wherein a value of the first control signal corresponds to a difference between the first ground and the second ground.

3. The electronic device of claim 1,
   wherein the controller circuit includes a Switch Mode Power Supply (SMPS) controller; and
   wherein the output signal is a gate signal to control a switching device of a SMPS.

4. The electronic device of claim 1, further comprising:
   a first voltage divider configured to produce the first control signal using the second ground and the first ground; and
   a second voltage divider configured to produce the second control signal using the third control signal and the first ground.

5. The electronic device of claim 1, wherein the first circuit is further configured to:
   produce, using the controller circuit, a detection signal indicating whether the value of the third control signal can be reliably determined using the difference between the value of the first control signal and the value of the second control signal;
   determine the value corresponding to the value of the third control signal using a difference between the value of the first control signal and the value of the second control signal when the detection signal indicates that the value of the third control signal can be reliably determined using the difference between the value of the first control signal and the value of the second control signal; and
   determine the value corresponding to the value of a third control signal using a previously sampled value of the difference between the value of the first control signal and the value of the second control signal when the detection signal does not indicate that the value of the third control signal can be reliably determined using the difference between the value of the first control signal and the value of the second control signal.

6. The electronic device of claim 5,
   wherein the controller circuit includes a Switch Mode Power Supply (SMPS) controller capable of operating in a Discontinuous Conduction Mode (DCM), the SMPS controller configured to:
   receive a current sense signal,
   produce, using the current sense signal and the value of the third control signal, the output signal, and
   produce a blanking signal to prevent the output signal from being spuriously asserted by ringing on the current sense signal, and
   wherein the detection signal is produced using the blanking signal.

7. An electronic device comprising:
   a first circuit having a first ground, the first circuit including:
   a Switch Mode Power Supply (SMPS) controller having a current sense input, a dimming voltage input, and a gate control output, the SMPS controller to control the gate control output according to values of the current sense input and values of the dimming voltage input, and
   a differential amplifier having first and second differential inputs and an amplifier output, the differential amplifier to receive a first control signal on the first differential input, receive a second control signal on the second differential input, and produce the amplifier output according to a difference between the first and second differential inputs,
   wherein the amplifier output is coupled to the dimming voltage input, wherein the first control signal is produced using a voltage divider coupled between the first ground and a second ground, wherein the second control signal is produced using a voltage divider coupled between the first ground and a third control signal, wherein the third control signal is produced by a second circuit, the second circuit having the second ground, and wherein the first ground floats relative to the second ground.

8. The electronic device of claim 7, wherein a value of the dimming voltage input relative to the first ground corresponds to a value of the third control signal relative to the second ground.

9. The electronic device of claim 7, where the first circuit further comprised: a sample-and-hold (S/H) circuit coupled between the amplifier output and the dimming voltage input, wherein the S/H circuit provides a value of the amplifier output to the dimming voltage input when a detect signal has a first value, and provides a previously sampled value of the amplifier output to the dimming voltage input when the detect signal has a second value.

10. The electronic device of claim 9, wherein the value of the detect signal is determined according to a blanking interval of the SMPS controller.

11. The electronic device of claim 7, further comprising a switching device, the switching device having a control terminal coupled to the gate control output, a first conduction terminal coupled to the first ground, and a second conduction terminal coupled to an energy-storage inductor.

12. A method of communicating a signal between two circuits, the method comprising:

receiving, by a first circuit, a first control signal;

receiving, by the first circuit, a second control signal;

determining, by the first circuit, a control value using a value of the first control signal and a value of the second signal; and controlling, by the first circuit, an output signal of the first circuit according to the control value, wherein the control value corresponds to a value of a third control signal, wherein the third control signal is generated by a second circuit, wherein the first circuit uses a first ground, wherein the second circuit uses a second ground, wherein the value of the second control signal corresponds to a voltage difference between the third control signal and the first ground, and wherein the first ground floats with respect to the second ground.

13. The method of claim 12, further comprising determining, by the first circuit, the control value by determining a difference between the value of the first control signal and the value of the second signal.

14. The method of claim 12, wherein the value of the first control signal corresponds to a voltage difference between the second ground and the first ground.

15. The method of claim 12, wherein the first control signal is produced using a voltage divider, the voltage divider being coupled to the second ground and the first ground, and wherein the second control signal is produced using a voltage divider, the voltage divider being coupled to the third control signal and the first ground.

16. The method of claim 12, wherein the first circuit comprises a Switch Mode Power Supply (SMPS) control circuit.

17. The method of claim 12, further comprising:

determining, by the first circuit, a blanking signal indicating that the control signal should not be asserted;

determining, by the first circuit, a detection signal according to the blanking signal;

determining, by the first circuit, the control value using a present value of the first control signal and a present value of the second signal when the detection signal is asserted; and determining, by the first circuit, the control value using a past value of the first control signal and a past value of the second signal when the detection signal is de-asserted.

18. The method of claim 12, further comprising:

receiving, by the first circuit, a current sense signal corresponding to a current flowing through an inductor; and controlling, by the first circuit, the output signal of the first circuit according to the control value and a value of the current sense signal.

* * * * *